United States Patent
Okamura et al.

(10) Patent No.: US 12,054,813 B2
(45) Date of Patent: Aug. 6, 2024

(54) METHOD OF PRODUCING CUBIC BORON NITRIDE SINTERED MATERIAL, CUBIC BORON NITRIDE SINTERED MATERIAL, AND CUTTING TOOL INCLUDING CUBIC BORON NITRIDE SINTERED MATERIAL

(71) Applicants: Sumitomo Electric Industries, Ltd., Osaka (JP); Sumitomo Electric Hardmetal Corp., Itami (JP)

(72) Inventors: Katsumi Okamura, Osaka (JP); Yuichiro Watanabe, Osaka (JP); Akito Ishii, Osaka (JP); Takashi Harada, Osaka (JP); Satoru Kukino, Itami (JP)

(73) Assignees: SUMITOMO ELECTRIC INDUSTRIES, LTD., Osaka (JP); SUMITO ELECTRIC HARDMETAL CORP., Itami (JP)

( * ) Notice: Subject to any disclaimer, the term of this patent is extended or adjusted under 35 U.S.C. 154(b) by 6 days.

(21) Appl. No.: 17/492,690

(22) Filed: Oct. 4, 2021

(65) Prior Publication Data

US 2022/0025490 A1 Jan. 27, 2022

Related U.S. Application Data

(63) Continuation of application No. 17/262,220, filed as application No. PCT/JP2019/036569 on Sep. 18, 2019, now Pat. No. 11,155,901.

(30) Foreign Application Priority Data

Sep. 19, 2018 (JP) .................................. 2018-174695

(51) Int. Cl.
*C22C 29/16* (2006.01)
*B23B 27/14* (2006.01)
(Continued)

(52) U.S. Cl.
CPC ............ *C22C 29/16* (2013.01); *B23B 27/148* (2013.01); *C04B 35/5831* (2013.01);
(Continued)

(58) Field of Classification Search
CPC ....... C22C 1/051; C22C 29/16; B23B 27/148; B23B 2226/125; B23B 2228/105;
(Continued)

(56) References Cited

U.S. PATENT DOCUMENTS 5,395,700 A * 3/1995 Nakai .................... C23C 30/005
428/568
7,902,098 B2 3/2011 Noda et al.
(Continued)

FOREIGN PATENT DOCUMENTS

CN 101602192 A * 12/2009
JP 2006-21977 A 1/2006
(Continued)

OTHER PUBLICATIONS

Notice of Reasons for Refusal mailed on Apr. 7, 2020, received for JP Application 2020-506827, 6 pages including English Translation.
(Continued)

*Primary Examiner* — James A Fiorito
*Assistant Examiner* — Ross J Christie
(74) *Attorney, Agent, or Firm* — XSENSUS LLP

(57) ABSTRACT

A method of producing a cubic boron nitride sintered material includes: forming an organic cubic boron nitride powder by attaching an organic substance onto a cubic boron nitride source material powder; preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder includ-
(Continued)

ing WC, Co and Al; and obtaining the cubic boron nitride sintered material by sintering the powder mixture.

7 Claims, 3 Drawing Sheets

(51) Int. Cl.
    *C04B 35/5831*     (2006.01)
    *C04B 35/63*     (2006.01)
    *C04B 35/64*     (2006.01)
    *C22C 1/051*     (2023.01)

(52) U.S. Cl.
    CPC .......... *C04B 35/6303* (2013.01); *C04B 35/64* (2013.01); *C22C 1/051* (2013.01); *B23B 2226/125* (2013.01); *B23B 2228/105* (2013.01); *C04B 2235/3847* (2013.01); *C04B 2235/386* (2013.01); *C04B 2235/402* (2013.01); *C04B 2235/405* (2013.01); *C04B 2235/422* (2013.01); *C04B 2235/85* (2013.01)

(58) Field of Classification Search
    CPC . C04B 35/5831; C04B 35/6303; C04B 35/64; C04B 2235/3847; C04B 2235/386; C04B 2235/402; C04B 2235/405; C04B 2235/422; C04B 2235/85
    See application file for complete search history.

(56) References Cited

U.S. PATENT DOCUMENTS

| | | |
|---|---|---|
| 2008/0016785 A1 | 1/2008 | Kukino et al. |
| 2008/0214383 A1 | 9/2008 | Matsukawa et al. |
| 2009/0120011 A1* | 5/2009 | Okamura ............ C04B 35/6268 428/206 |
| 2009/0169840 A1 | 7/2009 | Okamura et al. |
| 2012/0055099 A1 | 3/2012 | Bao et al. |
| 2014/0315015 A1 | 10/2014 | Fukushima |

FOREIGN PATENT DOCUMENTS

| | | |
|---|---|---|
| JP | 2006-169080 A | 6/2006 |
| JP | 2006-347850 A | 12/2006 |
| JP | 2007-70148 A | 3/2007 |
| WO | WO-9954060 A2 * | 10/1999 ............. B05D 1/185 |
| WO | 2005/066381 A1 | 7/2005 |
| WO | 2006/112156 A1 | 10/2006 |
| WO | 2007/145071 A1 | 12/2007 |

OTHER PUBLICATIONS

Decision to Grant mailed on Jul. 21, 2020, received for JP Application 2020-506827, 5 pages including English Translation.

* cited by examiner

20nm  NK

20nm  CK

METHOD OF PRODUCING CUBIC BORON NITRIDE SINTERED MATERIAL, CUBIC BORON NITRIDE SINTERED MATERIAL, AND CUTTING TOOL INCLUDING CUBIC BORON NITRIDE SINTERED MATERIAL

CROSS-REFERENCE TO RELATED APPLICATIONS

This application is a continuation of U.S. application Ser. No. 17/262,220, filed Jan. 22, 2021, which is based on PCT filing PCT/JP2019/036569, filed Sep. 18, 2019, which claims priority to JP 2018-174695, filed Sep. 19, 2018, the entire contents of each are incorporated herein by reference. This disclosure is also related to co-pending U.S. application Ser. No. 17/262,215, which is entitled: CUBIC BORON NITRIDE SINTERED BODY, CUTTING TOOL CONTAINING THIS, AND PRODUCTION METHOD OF CUBIC BORON NITRIDE SINTERED BODY, filed concurrently with the present application, which is also incorporated herein by reference.

TECHNICAL FIELD

The present disclosure relates to a method of producing a cubic boron nitride sintered material, the cubic boron nitride sintered material, and a cutting tool including the cubic boron nitride sintered material.

BACKGROUND ART

A cubic boron nitride sintered material (hereinafter, also referred to as "cBN sintered material") is a high-hardness material used for cutting tools and the like. The cubic boron nitride sintered material is normally constituted of cubic boron nitride grains (hereinafter, also referred to as "cBN grains") and a binder. Depending on a content ratio of the cubic boron nitride grains, characteristics of the cBN sintered material tend to differ.

Hence, in the field of cutting, different types of cubic boron nitride sintered materials are applied to cutting tools in accordance with the material of a workpiece, required precision in processing, or the like. For example, a cubic boron nitride sintered material (hereinafter, also referred to as a "high-cBN sintered material") having a high content ratio of cubic boron nitride (hereinafter, also referred to as "cBN") can be suitably used for cutting of a sintered alloy or the like.

However, the high-cBN sintered material tends to be likely to be unexpectedly chipped. Such sporadic chipping is considered to be caused due to the following reason: binding strength between the cubic boron nitride grains is weak to result in falling of the cubic boron nitride grains. For example, WO 2005/066381 (PTL 1) discloses a technique of suppressing occurrence of sporadic chipping in a high-cBN sintered material by appropriately selecting a binder.

CITATION LIST

Patent Literature

PTL 1: WO 2005/066381

SUMMARY OF INVENTION

A method of producing a cubic boron nitride sintered material according to one embodiment of the present disclosure includes: forming an organic cubic boron nitride powder by attaching an organic substance onto a cubic boron nitride source material powder; preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al; and obtaining the cubic boron nitride sintered material by sintering the powder mixture.

A cubic boron nitride sintered material according to one embodiment of the present disclosure includes: more than or equal to 85 volume % and less than 100 volume % of cubic boron nitride grains; and a remainder of a binder, wherein the binder includes WC, Co and an Al compound, and when a TEM-EDX is used to analyze an interface region including an interface at which the cubic boron nitride grains are adjacent to each other, carbon exists on the interface, and a width D of a region in which the carbon exists is more than or equal to 0.1 nm and less than or equal to 10 nm.

A cubic boron nitride sintered material according to another embodiment of the present disclosure includes: more than or equal to 85 volume % and less than 100 volume % of cubic boron nitride grains; and a remainder of a binder, wherein the binder includes WC, Co and an Al compound, when a TEM-EDX is used to analyze an interface region including an interface at which the cubic boron nitride grains are adjacent to each other, carbon exists on the interface, and a width D of a region in which the carbon exists is more than or equal to 0.1 nm and less than or equal to 5 nm, and a maximum value M of a content of the carbon in the region in which the carbon exists is more than or equal to 0.1 atom % and less than or equal to 5.0 atom %.

A cutting tool according to one embodiment of the present disclosure is a cutting tool including the above-described cubic boron nitride sintered material.

DETAILED DESCRIPTION

Figure 1:
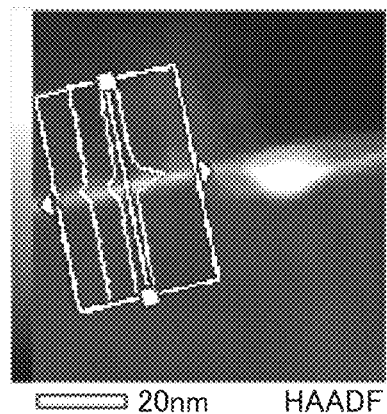
FIG. 1 shows an exemplary second image.

Problem to be Solved by the Present Disclosure

In recent years, due to rapid improvement in functions of mechanical parts, it becomes more difficult to cut workpieces to serve as the mechanical parts. This leads to a short life of a cutting tool, thus apparently resulting in increased cost, disadvantageously. Therefore, further improvement of a high-cBN sintered material has been desired. In view of this, it is an object of the present disclosure to provide a method of producing a cubic boron nitride sintered material having a long life, the cubic boron nitride sintered material, and a cutting tool including the cubic boron nitride sintered material.

Advantageous Effect of the Present Disclosure

According to the cubic boron nitride sintered material obtained as described above, a long life can be attained, with the result that the life of the cutting tool including the cubic boron nitride sintered material can also be long.

Description of Embodiments

In order to complete a cubic boron nitride sintered material having a longer life, the present inventors first have decided to use a binder source material powder including WC (tungsten carbide), Co (cobalt), and Al (aluminum) as a source material of the binder in the high-cubic boron nitride sintered material. This is because the present inventors have obtained the following knowledge in previous research: when such a binder source material powder is used, the binder has a particularly high binding strength with respect to cubic boron nitride grains, with the result that an excellent cubic boron nitride sintered material can be obtained.

However, in the high-cBN sintered material, the amount of the binder is significantly smaller than the amount of the cubic boron nitride grains. Hence, the binder tends to be less likely to be distributed widely between the cubic boron nitride grains. Therefore, the present inventors have considered that any breakthrough for attaining a long life of the high-cBN sintered material cannot be achieved only by optimizing the binder.

Therefore, from a greatly different point of view, the present inventors have sought for a technique of increasing binding strength between the cubic boron nitride grains, unlike the conventional technique of increasing binding strength between the binder and each of the cubic boron nitride grains. As a result of various studies, it has been found that a small amount of carbon between the cubic boron nitride grains leads to increased binding strength between the cubic boron nitride grains. However, when the amount of carbon between the cubic boron nitride grains is large, the characteristics of the cubic boron nitride sintered material are changed.

In view of the above knowledge, in order to significantly increase the binding strength between the cubic boron nitride grains by disposing carbon between the cubic boron nitride grains, the present inventors have considered it necessary to uniformly dispose carbon between the cubic boron nitride grains without the carbon existing in an imbalanced manner. In order to find a technique to attain this, the present inventors have conducted diligent study. As a result of the diligent study, the present inventors have found a technique of uniformly attaching an organic substance onto surfaces of particles of a cubic boron nitride source material powder, and also have found that carbon can be uniformly disposed between cubic boron nitride grains by producing a cubic boron nitride sintered material using the cubic boron nitride source material powder.

The present disclosure has been completed in the manner described above. Hereinafter, embodiments of the present disclosure will be listed and described.

[1] A method of producing a cubic boron nitride sintered material according to one embodiment of the present disclosure includes: forming an organic cubic boron nitride powder by attaching an organic substance onto a cubic boron nitride source material powder (forming step); preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al (preparing step); and obtaining the cubic boron nitride sintered material by sintering the powder mixture (sintering step).

According to the production method, a cubic boron nitride sintered material having a long life can be produced. This is presumably due to the following reason. First, the organic cubic boron nitride powder in which the organic substance is uniformly attached on the surfaces of the particles of the cubic boron nitride source material powder is formed by the forming step. Then, the powder mixture including the organic cubic boron nitride powder is prepared in the preparing step. In the subsequent sintering step, the cubic boron nitride sintered material is produced. In the sintering step, carbon on the surfaces of the particles of the organic cubic boron nitride powder exhibits a catalyst function.

Here, the catalyst function of the carbon refers to diffusion or precipitation of B (boron) and/or N (nitrogen) of the cubic boron nitride by way of the carbon. Since the carbon exhibits such a catalyst function, neck growth is promoted to occur between the particles of the organic cubic boron nitride powder, thereby increasing binding strength between the cubic boron nitride grains in the cubic boron nitride sintered material. As a result, falling of the cubic boron nitride grains are suppressed.

Therefore, according to the method of producing the cubic boron nitride sintered material according to one embodiment of the present disclosure, there can be produced a cubic boron nitride sintered material having a long life with falling of the cubic boron nitride grains being suppressed, even though the cubic boron nitride sintered material is a high-cBN sintered material.

[2] In the method of producing the cubic boron nitride sintered material, the forming of the organic cubic boron nitride powder includes introducing the cubic boron nitride source material powder and the organic substance into supercritical water. This facilitates preparation of the organic cubic boron nitride powder in which the organic substance is uniformly attached on the surfaces of the particles of the cubic boron nitride source material powder.

[3] In the method of producing the cubic boron nitride sintered material, the organic substance is an amine or a hydrocarbon compound having a carbon number of more than or equal to 5. Accordingly, the falling of the cubic boron nitride grains in the produced cubic boron nitride sintered material is dramatically reduced.

[4] In the method of producing the cubic boron nitride sintered material, the organic substance is hexylamine, hexanenitrile, paraffin, or hexane. Accordingly, the falling of the cubic boron nitride grains in the produced cubic boron nitride sintered material is dramatically reduced.

[5] In the method of producing the cubic boron nitride sintered material, the forming of the organic cubic boron nitride powder includes attaching the organic substance onto the cubic boron nitride source material powder by plasma treatment. This facilitates preparation of the organic cubic boron nitride powder in which the organic substance is uniformly attached on the surfaces of the particles of the cubic boron nitride source material powder.

[6] In the method of producing the cubic boron nitride sintered material, the organic substance is an amine or carbon fluoride. This makes it possible to prepare the organic cubic boron nitride powder in which the organic substance is uniformly attached on the surfaces of the particles of the cubic boron nitride source material powder.

[7] A cubic boron nitride sintered material according to one embodiment of the present disclosure includes: more than or equal to 85 volume % and less than 100 volume % of cubic boron nitride grains; and a remainder of a binder, wherein the binder includes WC, Co and an Al compound, and when a TEM-EDX is used to analyze an interface region including an interface at which the cubic boron nitride grains are adjacent to each other, carbon exists on a whole or part of the interface, and a width D of a region in which the carbon exists is more than or equal to 0.1 nm and less than or equal to 10 nm.

In view of the content of the cubic boron nitride grains, it is understood that the cubic boron nitride sintered material is a "high-cBN sintered material" in which falling of the cubic boron nitride grains is likely to occur. However, the cubic boron nitride sintered material is a cubic boron nitride sintered material produced by the above production method. Hence, when the TEM-EDX is used to analyze the interface region including the interface at which the cubic boron nitride grains are adjacent to each other, carbon exists on the interface, and the width D of the region in which the carbon exists is more than or equal to 0.1 nm and less than or equal to 10 nm. In such a cubic boron nitride sintered material, binding strength between the cubic boron nitride grains is increased as compared with the conventional cubic boron nitride sintered material. Therefore, the cubic boron nitride sintered material according to one embodiment of the present disclosure is a cubic boron nitride sintered material having a long life with falling of the cubic boron nitride grains being suppressed.

[8] In the cubic boron nitride sintered material, the width D is more than or equal to 0.1 nm and less than or equal to 5 nm. In this case, the life of the cubic boron nitride sintered material can be longer.

[9] In the cubic boron nitride sintered material, a maximum value M of a content of the carbon in the region in which the carbon exists is more than or equal to 0.1 atom % and less than or equal to 5.0 atom %. In this case, the life of the cubic boron nitride sintered material can be longer.

[10] A cubic boron nitride sintered material according to another embodiment of the present disclosure includes: more than or equal to 85 volume % and less than 100 volume % of cubic boron nitride grains; and a remainder of a binder, wherein the binder includes WC, Co and an Al compound, when a TEM-EDX is used to analyze an interface region including an interface at which the cubic boron nitride grains are adjacent to each other, carbon exists on a whole or part of the interface, and a width D of a region in which the carbon exists is more than or equal to 0.1 nm and less than or equal to 5 nm, and a maximum value M of a content of the carbon in the region in which the carbon exists is more than or equal to 0.1 atom % and less than or equal to 5.0 atom %. With such a configuration, the cubic boron nitride sintered material according to one embodiment of the present disclosure is a cubic boron nitride sintered material having a long life with falling of the cubic boron nitride grains being suppressed.

[11] A cubic boron nitride sintered material according to one embodiment of the present disclosure is a cutting tool including the above-described cubic boron nitride sintered material. According to the cutting tool, a long life can be attained.

Details of Embodiments of the Present Disclosure

The following describes one embodiment (hereinafter, referred to as "the present embodiment") of the present disclosure. The present embodiment is not limited thereto. It should be noted that in the present specification, the expression "A to Z" represents a range of lower to upper limits (i.e., more than or equal to A and less than or equal to Z). When no unit is indicated for A and a unit is indicated only for Z, the unit of A is the same as the unit of Z.

First Embodiment: Method of Producing Cubic Boron Nitride Sintered Material

A method of producing a cubic boron nitride sintered material according to the present embodiment will be described. The method of producing the cubic boron nitride sintered material according to the present embodiment at least includes: forming an organic cubic boron nitride powder by attaching an organic substance onto a cubic boron nitride source material powder (forming step); preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al (preparing step); and obtaining the cubic boron nitride sintered material by sintering the powder mixture (sintering step). Hereinafter, each step will be described in detail.

<<Forming Step>>

This step is a step of forming an organic cubic boron nitride powder by attaching an organic substance onto a cubic boron nitride source material powder.

The cubic boron nitride source material powder is a source material powder for the cubic boron nitride grains to be included in the cubic boron nitride sintered material. Examples of the method of attaching the organic substance onto the cubic boron nitride source material powder include: a method employing supercritical water; a method of performing plasma treatment; and the like.

(Method Employing Supercritical Water)

The method employing supercritical water will be described. In the method, a step of introducing the cubic boron nitride source material powder and the organic substance into supercritical water is performed. Accordingly, the organic cubic boron nitride powder can be formed. It should be noted that in the present specification, the supercritical water refers to water in a supercritical state or a subcritical state.

Examples of the method of introducing the cubic boron nitride source material powder and the organic substance into the supercritical water include: a method of introducing the cubic boron nitride source material powder and the organic substance into the supercritical water in this order; a method of introducing the organic substance and the cubic boron nitride source material powder in this order; and a method of introducing the cubic boron nitride source material powder and the organic substance simultaneously. According to each of these methods, the cubic boron nitride source material powder is brought into contact with the supercritical water, thereby cleaning the surfaces of the particles of the cubic boron nitride source material powder.

Further, the cubic boron nitride source material powder including the particles having the cleaned surfaces and the organic substance are brought into contact with each other, with the result that the organic substance is attached on the cleaned surfaces of the particles of the cubic boron nitride source material powder.

(Method of Performing Plasma Treatment)

The method of performing plasma treatment will be described. In the method, a step of attaching the organic substance onto the cubic boron nitride source material powder by plasma treatment is performed. Specifically, in a plasma generating apparatus, the cubic boron nitride source material powder is exposed to an atmosphere of first gas including carbon and is then exposed to an atmosphere of second gas including ammonia. As the first gas, $CF_4$, $CH_4$, $C_2H_2$ or the like can be used. As the second gas, a mixed gas of $NH_3$, $N_2$ and $H_2$, or the like can be used.

According to the above method, by exposing the cubic boron nitride source material powder to the atmosphere of first gas, the surfaces of the particles of the cubic boron nitride source material powder are etched, with the result that the cleaned surfaces are formed and the carbon (first gas) is attached onto the cleaned surfaces. Then, the cubic boron nitride source material powder having the carbon attached thereon is exposed to the atmosphere of second gas, with the result that the carbon is terminated by ammonia. As a result, the organic substance including carbon and nitrogen is attached on the cleaned surfaces.

As described above, the organic cubic boron nitride powder can be efficiently formed by one of the method employing supercritical water and the method of performing plasma treatment. In this step, it is preferable to use the method employing supercritical water. This is due to the following reason: the organic substance to be attached onto the cubic boron nitride source material powder can be readily made uniform and therefore the organic cubic boron nitride powder can be also readily made uniform.

In this step, the average particle size of the cubic boron nitride source material powder is not particularly limited. In order to form a cubic boron nitride sintered material having high strength, high wear resistance, and high defect resistance, the average particle size of the cubic boron nitride source material powder is preferably 0.1 to 10 µm, and is more preferably 0.5 to 5.0 µm.

When this step is performed using supercritical water, the organic substance to be used is preferably an amine or a hydrocarbon compound having a carbon number of more than or equal to 5. Among them, hexylamine, hexanenitrile, paraffin and hexane are more preferable. Hexylamine is further preferable. The present inventors have confirmed that when each of these organic substances is used, falling of the cubic boron nitride grains is dramatically reduced in the cubic boron nitride sintered material. When this step is performed using plasma treatment, examples of the organic substance to be attached include an amine, carbon fluoride, and the like.

A preferable amount of the organic substance to be attached onto the cubic boron nitride source material powder is changed depending on the particle size of the cubic boron nitride source material powder. For example, when hexylamine is used as the organic substance, 50 to 2000 ppm of hexylamine is preferably attached onto the cubic boron nitride source material powder having an average particle size of 1 to 10 µm, and 100 to 5000 ppm of hexylamine is preferably attached onto the cubic boron nitride source material powder having an average particle size of 0.1 to 1 µm. In each of such cases, a desired cubic boron nitride sintered material tends to be efficiently produced. The amount of the organic substance attached on the organic cubic boron nitride powder can be measured by, for example, gas chromatography mass spectroscopy.

Here, in the present embodiment, in the organic cubic boron nitride powder to be subjected to a below-described second step of the sintering step, carbon exists to such an extent that a sufficient catalyst function can be exhibited. Further, the amount of the organic substance attached on the cubic boron nitride source material powder tends to be decreased in a subsequent step (for example, a below-described purification step, preparing step, or the like). Therefore, even when the amount of the organic substance attached on the cubic boron nitride source material powder is different from the above-described amount, for example, is an excessive amount, it is considered that a suitable amount of carbon can remain on the organic cubic boron nitride powder to be subjected to the second step by making appropriate adjustment during each treatment of the subsequent step. It should be noted that the cubic boron nitride sintered material produced using the organic cubic boron nitride powder in which the suitable amount of carbon remains is a cubic boron nitride sintered material according to a second embodiment described later.

<<Purification Step>>

It is preferable to remove an impurity from the organic cubic boron nitride powder obtained by the above-described forming step, before using the organic cubic boron nitride powder in the below-described preparing step. Examples of the impurity include an unreacted organic substance. By removing the unreacted organic substance, an unintended reaction in the preparing step and/or sintering step can be suppressed.

For example, when the supercritical water is used, the organic cubic boron nitride powder is obtained as slurry. In this case, by performing centrifugal separation onto the slurry, the organic cubic boron nitride powder and the unreacted organic substance can be separated from each other.

Further, heat treatment may be performed (for example, at more than or equal to 250° C., preferably more than or equal to 400° C., or more preferably more than or equal to 850° C. in vacuum) onto the organic cubic boron nitride source material powder removed from the supercritical water or the organic cubic boron nitride source material powder having been subjected to the centrifugal separation or the like after being removed from the supercritical water. Thus, an impurity such as moisture on the surfaces of the particles of the organic cubic boron nitride powder can be removed.

Here, the present inventors have initially concerned that when the heat treatment is performed onto the organic cubic boron nitride powder, the organic substance attached on the cubic boron nitride source material powder is entirely volatilized and/or ceases to exist. Surprisingly, however, as a result of observing the organic cubic boron nitride powder by Auger electron spectroscopy, it was confirmed that carbon uniformly remains on the surfaces of the particles of the organic cubic boron nitride powder although the organic substance was decomposed due to the heat treatment. This carbon is considered to be originated from the organic substance.

That is, it was confirmed that by performing the heat treatment onto the organic cubic boron nitride powder, not only the impurity on the surfaces of the particles of the organic cubic boron nitride powder is removed but also the organic cubic boron nitride powder including the particles having the modified surfaces on which the carbon was uniformly attached was obtained. Although this mechanism is unknown, the present inventors presume that since the cleaned surfaces formed by the treatment with supercritical water, plasma, or the like have a significantly high activity, the cleaned surfaces and the organic substance are bound to each other very strongly and this strong binding is involved in the surface modification of the organic cubic boron nitride powder.

<<Preparing Step>>

This step is a step of preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al. The organic cubic boron nitride powder is the organic cubic boron nitride powder obtained by the above-described forming step, and the binder source material powder is a source material for the binder of the cubic boron nitride sintered material.

The binder source material powder can be prepared as follows. First, WC powder, Co powder, and Al powder are prepared. Next, the powders are mixed at a predetermined ratio and are subjected to heat treatment (for example, 1200° C.) in vacuum, thereby forming an intermetallic compound. The intermetallic compound is pulverized by a wet ball mill, a wet bead mill, or the like, thereby preparing the binder source material powder including WC, Co, and Al. It should be noted that the method of mixing the powders is not particularly limited; however, in order to efficiently and uniformly mix the powders, ball mill mixing, bead mill mixing, planetary mill mixing, jet mill mixing, or the like is preferable. Each of the mixing methods may be performed in a wet manner or dry manner.

The organic cubic boron nitride powder and the prepared binder source material powder are preferably mixed by wet ball mill mixing employing ethanol, acetone or the like as a solvent. After the mixing, the solvent is removed by natural drying. Then, an impurity such as moisture on the surfaces thereof is preferably removed by heat treatment (for example, at more than or equal to 850° C. in vacuum). Thus, on the surfaces of the particles of the organic cubic boron nitride powder, the organic substance is decomposed and the carbon originated from the organic substance can uniformly remain as described above, thereby obtaining the organic cubic boron nitride powder including the particles having the modified surfaces. In this way, the powder mixture is prepared.

The binder source material powder may include other element(s) in addition to WC, Co, and Al. Suitable examples of the other element(s) include Ni, Fe, Cr, Mn, Ti, V, Zr, Nb, Mo, Hf, Ta, Re, and the like.

<<Sintering Step>>

This step is a step of obtaining the cubic boron nitride sintered material by sintering the powder mixture. In this step, the powder mixture is sintered under a high-temperature and high-pressure condition, thereby producing the cubic boron nitride sintered material.

Specifically, first, as a first step, the powder mixture is introduced into a container and is vacuum-sealed. A vacuum sealing temperature is preferably more than or equal to 850° C. This temperature is a temperature of more than the melting point of a sealing material, and is a sufficient temperature by which the organic substance attached on the organic cubic boron nitride powder is decomposed and carbon originated from the organic substance remains uniformly on the surfaces of the particles of the organic cubic boron nitride powder.

Next, as a second step, the vacuum-sealed powder mixture is sintered using an ultra-high temperature and ultra-high pressure apparatus. Sintering conditions are not particularly limited, but are preferably 5.5 to 8 GPa and more than or equal to 1500° C. and less than 2000° C. In particular, in view of balance between cost and sintering performance, 6 to 7 GPa and 1600 to 1900° C. are preferable.

In the case where the heat treatment (the heat treatment in the purification step and/or the heat treatment in the preparing step) has been performed before this step, the organic cubic boron nitride powder including the particles having the modified surfaces on which carbon remains uniformly is subjected to the first step. In the case where no heat treatment has been performed before this step, the organic cubic boron nitride powder including the particles having the modified surfaces is prepared by the first step, i.e., the vacuum sealing. Therefore, carbon uniformly exists on the surfaces of the particles of the organic cubic boron nitride powder to be subjected to the second step. By performing the second step onto the powder mixture including such an organic cubic boron nitride powder, the cubic boron nitride sintered material is produced.

<<Function and Effect>>

According to the above-described method of producing the cubic boron nitride sintered material according to the present embodiment, a cubic boron nitride sintered material having a long life can be produced. This is presumably due to the following reason: the carbon existing uniformly on the surfaces of the particles of the organic cubic boron nitride powder exhibits a catalyst function to promote occurrence of neck growth between the cubic boron nitride grains, with the result that the cubic boron nitride sintered material excellent in binding strength between the cubic boron nitride grains is obtained.

Therefore, according to the method of producing the cubic boron nitride sintered material according to one embodiment of the present disclosure, there can be produced a cubic boron nitride sintered material having a long life with falling of the cubic boron nitride grains being suppressed, even though the cubic boron nitride sintered material is a high-cBN sintered material. It should be noted that when carbon is contained in the binder source material powder in the conventional method of producing a high-cBN sintered material, the carbon does not exist uniformly on the surfaces of the cubic boron nitride grains and exists in an imbalanced manner between the cubic boron nitride grains.

Second Embodiment: Cubic Boron Nitride Sintered Material

A cubic boron nitride sintered material according to the present embodiment will be described. The cubic boron nitride sintered material according to the present embodiment is a cubic boron nitride sintered material produced by the above-described production method.

Specifically, the cubic boron nitride sintered material according to the present embodiment includes more than or equal to 85 volume % and less than 100 volume % of the cubic boron nitride grains and the remainder of the binder. That is, the cubic boron nitride sintered material according to the present embodiment is a so-called high-cBN sintered material. It should be noted that the cubic boron nitride sintered material may include an inevitable impurity resulting from a source material used herein, a production condition, or the like. In this case, it is understandable that the inevitable impurity is included in the binder.

The content ratio (volume %) of the cubic boron nitride grains in the cubic boron nitride sintered material is substantially the same as the content ratio (volume %) of the cubic boron nitride source material powder used in the powder mixture described later. This is because an amount of change in volume caused by the attachment of the organic substance or the like is very small with respect to the volume of the cubic boron nitride powder itself. Therefore, by controlling the content ratio of the cubic boron nitride source material powder used in the powder mixture, the content (content ratio) of the cubic boron nitride grains in the cubic boron nitride sintered material can be adjusted to fall in a desired range.

The content ratio (volume %) of the cubic boron nitride grains in the cubic boron nitride sintered material can also be confirmed by performing quantitative analysis through inductively coupled high-frequency plasma spectrometry (ICP), or by performing structure observation, element analysis, or the like onto the cubic boron nitride sintered material using an energy dispersive X-ray analyzer (EDX) accompanied with a scanning electron microscope (SEM) or an EDX accompanied with a transmission electron microscope (TEM). In the present embodiment, unless otherwise specified, the content ratio of the cubic boron nitride grains in the cubic boron nitride sintered material is determined by a below-described method using SEM.

For example, when the SEM is used, the content ratio (volume %) of the cubic boron nitride grains can be determined as follows. First, the cubic boron nitride sintered material is cut at an arbitrary position to form a sample including a cross section of the cubic boron nitride sintered material. For the formation of the cross section, a focused ion beam device, a cross section polisher device, or the like can be used. Next, the cross section is observed by the SEM at a magnification of 2000× to obtain a reflected electron image. In the reflected electron image, a black region represents a region in which the cubic boron nitride grains exist and a gray or white region represents a region in which the binder exists.

Next, the reflected electron image is subjected to binarization processing using image analysis software (for example, "WinROOF" provided by Mitani Corporation), and each of the area ratios is calculated from the image having been through the binarization processing. The calculated area ratio is regarded as volume %, thereby finding the content ratio (volume %) of the cubic boron nitride grains. It should be noted that with this, the volume % of the binder can be found at the same time.

<<Cubic Boron Nitride Grains>>

The cubic boron nitride grains have high hardness, high strength, and high toughness, and serves as a base of the cubic boron nitride sintered material. $D_{50}$ (average grain size) of the cubic boron nitride grains is not particularly limited, and may be, for example, 0.1 to 10.0 µm. Normally, as $D_{50}$ is smaller, the hardness of the cubic boron nitride sintered material tends to be higher. Moreover, as variation in the grain sizes is smaller, the characteristics of the cubic boron nitride sintered material tend to be more uniform. $D_{50}$ of the cubic boron nitride grains is preferably, for example, 0.5 to 4.0 µm.

$D_{50}$ of the cubic boron nitride grains is determined as follows. First, a sample including a cross section of the cubic boron nitride sintered material is formed in a manner similar to that in the above-described method of finding the content of the cubic boron nitride grains, and a reflected electron image is obtained. Next, the equivalent circle diameter of each black region in the reflected electron image is calculated using image analysis software. It is preferable to calculate the equivalent circle diameters of 100 or more cubic boron nitride grains by performing observation in five or more visual fields.

Next, the equivalent circle diameters are arranged in an ascending order from the minimum value to the maximum value to find a cumulative distribution. $D_{50}$ represents a grain size corresponding to a cumulative area of 50% in the cumulative distribution. It should be noted that the equivalent circle diameter refers to the diameter of a circle having the same area as the area of the measured cubic boron nitride grain.

<<Binder>>

The binder serves to sinter cubic boron nitride particles at industrial levels of pressure and temperature. Each of the cubic boron nitride particles is a difficult-to-be-sintered material. Further, since the binder has lower reactivity with respect to iron than that of cubic boron nitride, the binder provides the cubic boron nitride sintered material with a function of suppressing chemical wear and thermal wear in cutting of high-hardness hardened steel. When the cubic boron nitride sintered material includes the binder, wear resistance in high-efficiency processing of high-hardness hardened steel is improved.

In the cubic boron nitride sintered material of the present embodiment, the binder includes WC, Co, and an Al compound. Here, the "Al compound" refers to a compound including Al as a constituent element. Examples of the Al compound include CoAl, $Al_2O_3$, AlN, $AlB_2$, composite compounds thereof, and the like. Due to the following reasons, the binder including WC, Co and the Al compound is considered to be particularly effective in attaining a long life of the cubic boron nitride sintered material according to the present embodiment.

First, since each of Co and Al has a catalyst function, neck growth between the cubic boron nitride grains can be promoted in the sintering step. Second, WC is presumed to be effective in providing the binder with a thermal expansion coefficient close to the thermal expansion coefficient of the cubic boron nitride grains. It should be noted that the catalyst function means that B (boron) and/or N (nitrogen) of the cubic boron nitride grains is diffused or precipitated by way of Co or Al.

The composition of the binder included in the cubic boron nitride sintered material can be specified by combining XRD (X-ray diffraction measurement) and ICP. Specifically, first, a specimen having a thickness of about 0.45 to 0.50 mm is cut from the cubic boron nitride sintered material, and XRD analysis is performed onto the specimen to determine a compound, a metal, or the like based on an X-ray diffraction peak. Next, the specimen is immersed in hydrofluoric-nitric acid (acid mixture with concentrated nitric acid (60%): distilled water:concentrated hydrofluoric acid (47%)=2:2:1 at a volume ratio) within a sealed container, thereby obtaining an acid-treated solution having the binder dissolved therein. The acid-treated solution is subjected to ICP analysis to perform quantitative analysis for each metal element. The composition of the binder is determined by analyzing the results of XRD and ICP analysis.

The binder in the present embodiment may include other binder(s) in addition to WC, Co, and the Al compound.

Suitable examples of the element(s) of the other binder(s) include Ni, Fe, Cr, Mn, Ti, V, Zr, Nb, Mo, Hf, Ta, Re, and the like.

<<Analysis with TEM-EDX>>

A feature of the cubic boron nitride sintered material according to the present embodiment lies in that the following conditions (1) and (2) are satisfied when the interface region including the interface at which the cubic boron nitride grains are adjacent to each other is analyzed using TEM-EDX:

(1) Carbon exists on the interface; and
(2) Width D of the region in which the carbon exists is 0.1 to 10 nm.

The analysis using TEM-EDX is performed as follows. First, a sample is obtained from the cubic boron nitride sintered material, and an argon ion slicer is used to slice the sample to form a cut piece having a thickness of 30 to 100 nm. Then, the cut piece is observed using a TEM (transmission electron microscope) at a magnification of 50000×, thereby obtaining a first image. Examples of the transmission electron microscope used on this occasion include "JEM-2100F/Cs" (trademark) provided by JEOL. In the first image, one interface at which the cubic boron nitride grains are adjacent to each other is arbitrarily selected. Next, the selected interface is positioned to pass through the vicinity of the center of the image, and observation is performed at an observation magnification changed to 2000000×, thereby obtaining a second image. In the obtained second image (100 nm×100 nm), the interface exists to extend from one end of the image to the other one end of the image opposite to the foregoing one end, via the vicinity of the center of the image.

Next, element mapping analysis is performed onto the second image using EDX so as to analyze the distribution of carbon in the second image, i.e., in the interface region including the interface. Examples of the energy dispersive X-ray analyzer used on this occasion include "EDAX" (trademark) provided by AMETEK. When a region having a high concentration of carbon is observed on the interface (to coincide with the shape of the interface), the cubic boron nitride sintered material satisfies the above-described condition (1).

In the second image of the cubic boron nitride sintered material satisfying the condition (1), an extending direction in which the interface extends (extending direction in which the region having a high concentration of carbon extends) is confirmed, and then element line analysis is performed in a direction substantially perpendicular to the extension direction. A beam diameter on that occasion is less than or equal to 0.3 nm, and a scanning interval is 0.1 to 0.7 nm. Width D of the region in which carbon exists is calculated in accordance with the result of the element line analysis. When width D is 0.1 to 10 nm, the cubic boron nitride sintered material satisfies the above-described condition (2).

The above-described analyses are repeated in first images corresponding to six visual fields. When it is confirmed that the conditions (1) and (2) are satisfied in one or more visual fields, the cubic boron nitride sintered material can be regarded as the cubic boron nitride sintered material according to the present embodiment. On this occasion, the condition (1) can be recognized also as "carbon exists on a whole or part of the interface".

The above analyses will be described more in detail with reference to FIGS. 1 to 5 in order to facilitate understanding.

FIG. 1 shows an exemplary second image. Referring to FIG. 1, a black region corresponds to a region (BN region) including B and N as main constituent elements, and a white region or a gray region corresponds to a region (SF region) recognized as the interface in the first image. As shown in FIG. 1, the SF region in the second image corresponds to the "interface at which the cubic boron nitride grains are adjacent to each other", and the whole of the second image corresponds to the "interface region including the interface".

Here, when the width of the SF region (in a substantially upward/downward direction in FIG. 1) is more than 10 nm in the second image, one different interface is reselected in the first image. This is due to the following reason: when the width of the SF region is more than 10 nm, it is difficult to say that the SF region corresponds to the "interface at which the cubic boron nitride grains are adjacent to each other".

Figure 2:
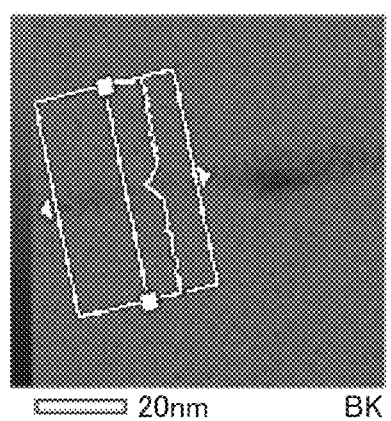
FIG. 2 shows an exemplary element distribution based on a result of element mapping analysis with an image indicating a distribution state of boron.
Figure 3:
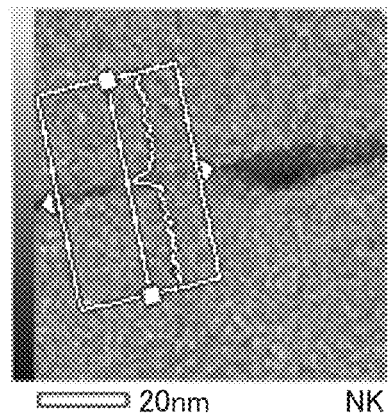
FIG. 3 shows an exemplary element distribution based on a result of element mapping analysis with an image indicating a distribution state of nitrogen.
Figure 4:
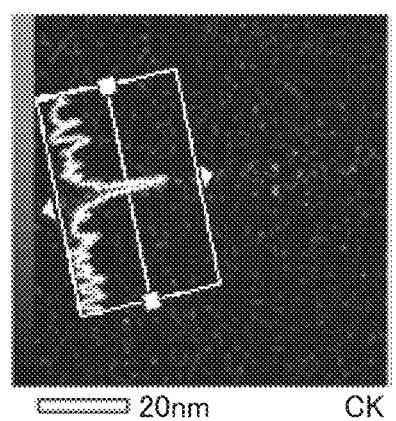
FIG. 4 shows an exemplary element distribution based on a result of element mapping analysis with an image indicating a distribution state of carbon.

FIGS. 2 to 4 show results of performing the element mapping analysis onto the second image shown in FIG. 1 using EDX. FIGS. 2 to 4 show distribution states of boron, nitrogen, and carbon, respectively. In the element mapping analysis, a position at which an element exists indicate a light color. Thus, in each of FIGS. 2 to 4, a region indicating a dark color is a region in which a corresponding element does not exist (or a very small amount of the corresponding element exists). As a region has a lighter color, a larger amount of the corresponding element exists in the region.

Referring to FIGS. 2 and 3, the distribution amounts of boron and nitrogen in the SF region are decreased as compared with the distribution amounts of B and N in the BN region. On the other hand, in view of FIG. 4, it is understandable that carbon exists in the SF region. In FIG. 4, the region in which carbon exists (hereinafter, also referred to as "carbon-containing region") extends in the leftward/rightward direction in the figure and substantially coincides with the SF region.

Figure 5:
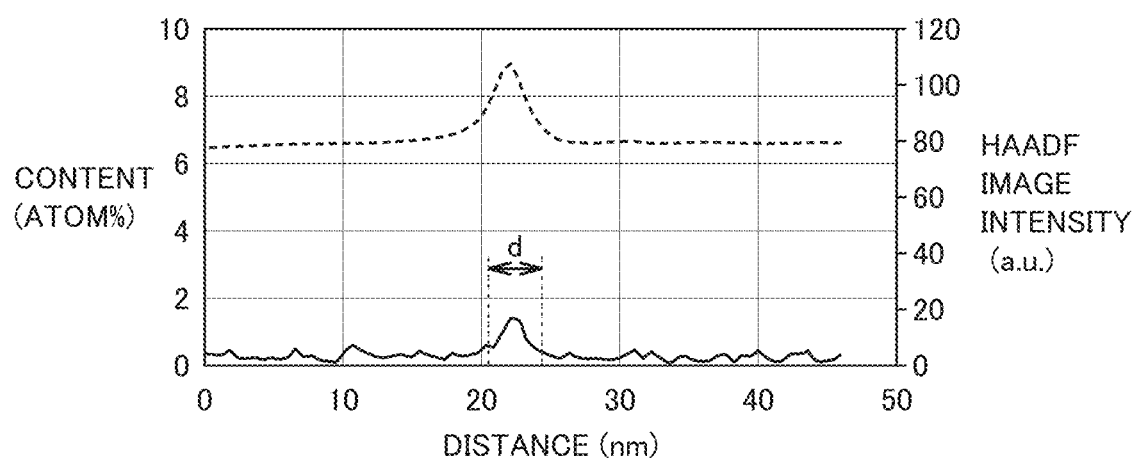
FIG. 5 is an exemplary graph showing a result of line analysis.

A white solid line indicated in the image shown in FIG. 4 represents a result of performing the element line analysis in the direction (upward/downward direction in FIG. 4) substantially perpendicular to the extending direction (leftward/rightward direction in FIG. 4) of the carbon-containing region. FIG. 5 shows this in the form of a graph. FIG. 5 shows a result in a solid line with the horizontal axis representing a distance (nm) in which the line analysis is performed and with the vertical axis representing a value of the carbon content (atom %) at a spot as calculated in accordance with the result of the line analysis. Moreover, for the sake of reference, FIG. 5 shows a result in a dotted line with the horizontal axis representing the distance (nm) in which the line analysis is performed and with the vertical axis representing an intensity (a.u.) of an HAADF (High-Angle Annular Dark Field) image.

Referring to FIG. 5, in a region of the HAADF image having a high intensity, i.e., in the interface region, a peak of the content ratio (atom %) of carbon is observed. The portion at which the peak is observed is the "region in which carbon exists", and width d of the peak is "width D of the region in which carbon exists".

<<Function and Effect>>

According to the cubic boron nitride sintered material according to the present embodiment, a long life can be attained. This is due to the following reason: since the cubic boron nitride sintered material according to the present embodiment is a cubic boron nitride sintered material produced by the production method according to the first embodiment, carbon exists uniformly on the interface between the cubic boron nitride grains, thereby increasing binding strength between the cubic boron nitride grains. According to various studies, it has been confirmed that the above-described conditions (1) and (2) are preferably satisfied in three or more of the six visual fields observed in the above-described method.

On the other hand, when width D is more than 10 nm, a cubic boron nitride sintered material having a long life cannot be obtained. This is presumably due to the following reason. That is, when an amount of carbon remaining on each of the surfaces of the cubic boron nitride grains is too large, width D becomes more than 10 nm. In this case, an excess of free carbon exists in the cubic boron nitride grain, thus resulting in decreased binding strength between the cubic boron nitride grains. On the other hand, also when width D is less than 0.1 nm, a cubic boron nitride sintered material having a long life cannot be obtained. This is presumably due to the following reason: the amount of carbon existing on each of the surfaces of the cubic boron nitride grains is too small and is therefore not sufficient to improve the binding strength between the cubic boron nitride grains. Further, width D of the cubic boron nitride sintered material according to the present embodiment is preferably 0.1 to 5 nm. In this case, the life of the cubic boron nitride sintered material can be longer.

It should be noted that carbon may exist between the cubic boron nitride grains also in the conventional high-cBN sintered material. However, this carbon is originated from the binder, and therefore exists in an imbalanced manner between the cubic boron nitride grains and does not exist uniformly between the cubic boron nitride grains. The width of the region in which carbon exists in the imbalanced manner is large to be about 0.1 to 2.0 μm and does not satisfy the above-described condition (2).

In the cubic boron nitride sintered material according to the present embodiment, maximum value M of the content of the carbon in the region in which the carbon exists (the carbon-containing region of the second image) is preferably 0.1 to 5.0 atom %. In this case, the life of the cubic boron nitride sintered material can be longer. Maximum value M of the content of the carbon is the maximum value among the content ratios (atom %) of carbon at respective spots as calculated in accordance with the result of the line analysis. For example, in FIG. 5, maximum value M of the content of the carbon in the carbon-containing region is about 1.4 atom %.

Meanwhile, when maximum value M is less than 0.1 atom %, the above-described effect may not be suitably exhibited. On the other hand, when maximum value M is more than 5.0 atom %, an excess of free carbon exists, thus presumably resulting in decreased binding strength between the grains, conversely.

Particularly when width D is 0.1 to 5 nm and maximum value M is 0.1 to 5.0 atom %, the cubic boron nitride sintered material according to the present embodiment has a significantly long life.

Third Embodiment: Cutting Tool

A cutting tool according to the present embodiment includes the above-described cubic boron nitride sintered material. In one aspect of the present embodiment, the cutting tool includes the cubic boron nitride sintered material as a substrate. The cutting tool according to the present embodiment may have a coating film on a surface of the cubic boron nitride sintered material serving as a substrate.

The shape and application of the cutting tool according to the present embodiment are not particularly limited. Examples of the cutting tool according to the present embodiment include a drill, an end mill, an indexable cutting insert for drill, an indexable cutting insert for end mill, an indexable cutting insert for milling, an indexable cutting insert for turning, a metal saw, a gear cutting tool, a reamer, a tap, an insert for crankshaft pin milling, and the like.

Further, the cutting tool according to the present embodiment is not limited to a cutting tool entirely composed of the cubic boron nitride sintered material, and includes a cutting tool having a portion (particularly, a cutting edge portion or the like) composed of the cubic boron nitride sintered material. For example, the cutting tool according to the present embodiment also includes a cutting tool in which a base body (supporting body) composed of a cemented carbide or the like has a cutting edge portion composed of the cubic boron nitride sintered material. In this case, the cutting edge portion is literally regarded as a cutting tool. In other words, even when the cubic boron nitride sintered material constitutes only a portion of the cutting tool, the cubic boron nitride sintered material is referred to as a cutting tool.

According to the cutting tool according to the present embodiment, the cutting tool includes the above-described cubic boron nitride sintered material, and therefore has a long life.

The above description includes features described below.

(Clause 1)

A method of producing a cubic boron nitride sintered material, the method comprising:
forming an organic cBN powder by attaching an organic substance onto a cBN source material powder;
preparing a powder mixture including more than or equal to 85 volume % and less than 100 volume % of the organic cBN powder and a remainder of a binder source material powder by mixing the organic cBN powder and the binder source material powder, the binder source material powder including WC, Co and Al; and
obtaining the cBN sintered material by sintering the powder mixture.

(Clause 2)

The method of producing the cubic boron nitride sintered material according to clause 1, wherein the forming of the organic cBN powder includes introducing the cBN source material powder and the organic substance into supercritical water.

(Clause 3)

The method of producing the cubic boron nitride sintered material according to clause 1, wherein the forming of the organic cBN powder includes attaching the organic substance onto the cBN source material powder by plasma treatment.

(Clause 4)

A cubic boron nitride sintered material comprising: more than or equal to 85 volume % and less than 100 volume % of cBN grains; and a remainder of a binder, wherein
the binder includes WC, Co and an Al compound, and
when a TEM-EDX is used to analyze an interface region including an interface at which the cBN grains are adjacent to each other,
carbon exists on the interface, and
a width D of a region in which the carbon exists is more than or equal to 0.1 nm and less than or equal to 10 nm.

(Clause 5)

The cubic boron nitride sintered material according to clause 4, wherein the width D is more than or equal to 0.1 nm and less than or equal to 5 nm.

(Clause 6)

The cubic boron nitride sintered material according to clause 4 or 5, wherein a maximum value M of a content of the carbon in the region in which the carbon exists is more than or equal to 0.1 atom % and less than or equal to 5.0 atom %.

(Clause 7)

A cutting tool comprising the cubic boron nitride sintered material recited in any one of clauses 4 to 6.

EXAMPLES

Hereinafter, the present invention will be described more in detail with reference to Examples, but the present invention is not limited thereto.

Experiment Example 1

First, an organic cubic boron nitride powder was formed. Specifically, first, supercritical water was formed using a supercritical water synthesis apparatus ("Momicho mini" provided by ITEC) under the following conditions.

Pressure: 35 MPa
Temperature: 375° C.
Flow Rate: 2 ml/min.

Next, a hexylamine source solution was continuously introduced into the apparatus to attain a hexylamine concentration of 10.0 weight % in the supercritical water. Further, a cubic boron nitride source material powder having an average particle size of 2 μm was continuously introduced into the apparatus to attain an amount of the cubic boron nitride source material powder of 10 weight % in the supercritical water. In this way, the cubic boron nitride source material powder and the organic substance were introduced into the supercritical water.

After the above-described supercritical water treatment was continued for 100 minutes, the temperature and pressure in the apparatus was returned to normal temperature and pressure to end the preparing step, and a whole of the obtained slurry was collected. The slurry was centrifuged (at 10000 rpm for 5 minutes) to separate an excess of hexylamine not attached on the cubic boron nitride source material powder. The concentrated slurry after the separation was dried (at −90° C. for 12 hours) to collect about 20 g of powder having been through the supercritical water treatment.

In this way, the organic cubic boron nitride powder was formed. The formed organic cubic boron nitride powder was subjected to gas chromatography mass spectroscopy, thus confirming that 895 ppm of hexylamine existed (attached) with respect to the cubic boron nitride powder.

Next, a binder source material powder serving as a source material of the binder was prepared. Specifically, WC powder, Co powder, and Al powder were prepared, and they were blended at a ratio of WC:Co:Al=50:40:10 in weight %. It should be noted that the average particle size of each powder was 2 μm. The mixture was made uniform by heat treatment (at 1200° C. for 30 minutes in vacuum), and was then pulverized into fine particles by a carbide ball mill. In this way, a binder source material powder having an average particle size of 1 μm was obtained.

The organic cubic boron nitride powder and the obtained binder source material powder were blended at the following ratio: the organic cubic boron nitride powder:the binder source material powder=85:15 in volume %. Then, they were mixed uniformly by the wet ball mill method using ethanol. Thereafter, the mixed powder was subjected to heat treatment at 900° C. in vacuum. The organic cubic boron nitride powder having been through the heat treatment was analyzed by Auger electron spectroscopy, thus confirming that carbon remained on the surfaces of the particles of the organic cubic boron nitride powder. In this way, a powder mixture was formed.

Next, the obtained powder mixture was sintered to form a cubic boron nitride sintered material. Specifically, the powder mixture was introduced into a container composed of Ta with the powder mixture being in contact with a WC-6% Co cemented carbide disc and a Co foil, and was vacuum-sealed. This powder mixture was sintered at 7.0 GPa and 1700° C. for 15 minutes using a belt-type ultra-high pressure and ultra-high temperature generating apparatus. In this way, the cubic boron nitride sintered material was formed.

Experiment Example 2

The concentration of hexylamine to be introduced was set to 8.0 weight %. The organic cubic boron nitride powder and the binder source material powder were blended at the following ratio: the organic cubic boron nitride powder:the binder source material powder=95:5 in volume %. Then, they were uniformly mixed by the wet ball mill method using ethanol. Thereafter, heat treatment was performed onto the mixed powder at 250° C. in vacuum. Except for the above, a cubic boron nitride sintered material was formed in the same manner as in Experiment Example 1. The organic cubic boron nitride powder was subjected to gas chromatography mass spectroscopy, thus confirming that 821 ppm of hexylamine existed with respect to cubic boron nitride.

Experiment Example 3

The concentration of hexylamine to be introduced was set to 6.0 weight %. The organic cubic boron nitride powder and the binder source material powder were blended at the following ratio: the organic cubic boron nitride powder:the binder source material powder=92:8 in volume %. Then, they were uniformly mixed by the wet ball mill method using ethanol. Thereafter, heat treatment was performed onto the mixed powder at 400° C. in vacuum. Except for the above, a cubic boron nitride sintered material was formed in the same manner as in Experiment Example 1. The organic cubic boron nitride powder was subjected to gas chromatography mass spectroscopy, thus confirming that 543 ppm of hexylamine existed with respect to cubic boron nitride.

Experiment Example 4

The concentration of hexylamine to be introduced was set to 4.0 weight %, and the organic cubic boron nitride powder and the binder source material powder were blended at the following ratio: the organic cubic boron nitride powder:the binder source material powder=92:8 in volume %. Except for the above, a cubic boron nitride sintered material was formed in the same manner as in Experiment Example 1. The organic cubic boron nitride powder was subjected to gas chromatography mass spectroscopy, thus confirming that 302 ppm of hexylamine existed with respect to cubic boron nitride.

Experiment Example 5

The concentration of hexylamine to be introduced was set to 13.0 weight %, and the organic cubic boron nitride powder and the binder source material powder were blended at the following ratio: the organic cubic boron nitride powder:the binder source material powder=92:8 in volume %. Except for the above, a cubic boron nitride sintered material was formed in the same manner as in Experiment Example 1. The organic cubic boron nitride powder was subjected to gas chromatography mass spectroscopy, thus confirming that 1343 ppm of hexylamine existed with respect to cubic boron nitride.

Experiment Example 6

Instead of the method employing the supercritical water, the organic cubic boron nitride powder was formed by plasma treatment. Specifically, the surfaces of the particles of the cubic boron nitride source material powder were etched in a $CF_4$ atmosphere using a plasma modification apparatus (low-pressure plasma apparatus FEMTO provided by Dienner), and then the atmosphere in the apparatus was changed to an $NH_3$ atmosphere for the purpose of treatment of the cubic boron nitride source material powder having been etched. Except for the above, the cubic boron nitride sintered material was produced in the same manner as in Experiment Example 1.

Experiment Example 7

A cubic boron nitride sintered material was produced in the same manner as in Experiment Example 2 except that the plasma treatment was used instead of the method employing supercritical water.

Experiment Example 8

A cubic boron nitride sintered material was produced in the same manner as in Experiment Example 3 except that the plasma treatment was used instead of the method employing supercritical water.

Experiment Example 9

A cubic boron nitride sintered material was produced in the same manner as in Experiment Example 4 except that the plasma treatment was used instead of the method employing supercritical water.

Experiment Example 10

A cubic boron nitride sintered material was produced in the same manner as in Experiment Example 5 except that the plasma treatment was used instead of the method employing supercritical water.

Experiment Example 21

A cubic boron nitride sintered material was produced in the same manner as in Experiment Example 3 except that the powder mixture was prepared using a cubic boron nitride source material powder without the treatment employing supercritical water.

Experiment Example 22

A cubic boron nitride sintered material was formed in the same manner as in Experiment Example 4 except that the organic cubic boron nitride powder and the binder source material powder were blended at the following ratio: the organic cubic boron nitride powder:the binder source material powder=65:35 in volume %.

Experiment Example 23

A cubic boron nitride sintered material was formed in the same manner as in Experiment Example 1 except that the treatment employing supercritical water was not performed and only the cubic boron nitride source material powder was used with no binder source material powder being blended.

In the manner described above, the cubic boron nitride sintered materials of Experiment Examples 1 to 10 and Experiment Examples 21 to 23 were formed. Here, Experiment Examples 1 to 10 correspond to examples of the present disclosure. Experiment Examples 21 to 23 correspond to comparative examples.

<Evaluation on Characteristics>
<<Width D and Maximum Value M>>

Each of the formed cubic boron nitride sintered materials was cut at an appropriate position, and then its exposed surface was polished to form a smooth surface. Thereafter, an argon ion slicer was used to slice the cubic boron nitride sintered material to form a cut piece having a thickness of 50 nm. Next, element mapping analysis and element line analysis by EDX were performed onto a second image (100 nm×100 nm) in accordance with the methods described above. On this occasion, "JEM-2100F/Cs" (trademark) provided by JEOL was used as a transmission electron microscope. As the energy dispersive X-ray analyzer, EDAX (trademark) provided by AMETEK was used. A beam diameter in the EDX was 0.2 nm and a scanning interval was 0.6 nm. Analysis Station provided by JEOL was used as software for the element mapping analysis and element line analysis by EDX. Results thereof are shown in Table 1.

It should be noted that each value shown in Table 1 represents an average value in the visual fields in each of which the above-described conditions (1) and (2) are satisfied. In each of the cut pieces of Experiment Examples 1 and 4 to 10, the above-described conditions (1) and (2) were satisfied in all of six arbitrarily extracted interface regions. In Experiment Example 2, the above-described conditions (1) and (2) were satisfied in one visual field of six arbitrarily extracted interface regions. In Experiment Example 3, the above-described conditions (1) and (2) were satisfied in three visual fields of six arbitrarily extracted interface regions.

<<Composition of Binder>>

A specimen having a length of 6 mm, a width of 3 mm, and a thickness of 0.45 to 0.50 mm was cut from each of the formed cubic boron nitride sintered materials, and XRD analysis was performed onto the specimen. Next, each specimen was immersed in hydrofluoric-nitric acid (acid mixture with concentrated nitric acid (60%):distilled water: concentrated hydrofluoric acid (47%)=2:2:1 at a volume ratio) at 140° C. for 48 hours within a sealed container, thereby obtaining an acid-treated solution having the binder dissolved therein. The acid-treated solution was subjected to ICP analysis. The composition of the binder was specified in accordance with the results of XRD analysis and ICP analysis.

<<Bending Strength>>

The bending strength (GPa) of each specimen having been through the acid treatment was measured using a three-point bending tester at a stroke speed of 0.5 mm/min with a span of 4 mm. Results thereof are shown in Table 1.

<<Cutting Test>>

A cutting tool (substrate shape: CNGA120408; cutting edge treatment: T01215) was formed using each of the formed cubic boron nitride sintered materials. A cutting test was performed using this cutting tool under the following cutting conditions.

Cutting speed: 150 m/min.
Feeding speed: 0.05 mm/rev.
Depth of cut: 0.1 mm
Coolant: DRY
Cutting method: intermittent cutting
Lathe: LB400 (provided by OKUMA Corporation)
Workpiece: sintered component (hardened sintered alloy D-40 provided by Sumitomo Electric Industries with a hardened cutting portion having a hardness of 40 HRC).

The cutting edge was observed per cutting distance of 0.4 km so as to measure an amount of falling from the cutting edge. The amount of falling from the cutting edge was defined as a reduced width from the position of the ridgeline of the cutting edge before the cutting. The reduced width results from wear. In the case of occurrence of chipping, the size of chipping was defined as the amount of falling. A cutting distance at a point of time at which the amount of falling from the cutting edge became more than or equal to 0.05 mm was measured. It should be noted that this cutting distance was defined as an index of the life of the cutting tool. Results thereof are shown in Table 1.

TABLE 1

| | cBN (Volume %) | Width D (nm) | Maximum Value M (Atom %) | Bending Strength (GPa) | Cutting Distance (km) |
|---|---|---|---|---|---|
| Experiment Example 1 | 85 | 5.0 | 7.2 | 0.51 | 1.53 |
| Experiment Example 2 | 95 | 0.1 | 0.1 | 0.66 | 1.76 |
| Experiment Example 3 | 92 | 2.1 | 4.0 | 0.85 | 1.92 |
| Experiment Example 4 | 92 | 5.0 | 5.0 | 0.82 | 1.82 |
| Experiment Example 5 | 92 | 10.0 | 5.0 | 0.54 | 1.52 |
| Experiment Example 6 | 85 | 5.0 | 7.5 | 0.46 | 1.41 |
| Experiment Example 7 | 95 | 2.3 | 4.3 | 0.75 | 1.62 |
| Experiment Example 8 | 92 | 2.2 | 4.7 | 0.52 | 1.75 |
| Experiment Example 9 | 92 | 5.0 | 4.5 | 0.74 | 1.68 |
| Experiment Example 10 | 92 | 8.2 | 4.8 | 0.49 | 1.48 |
| Experiment Example 21 | 92 | — | — | 0.43 | 0.60 |
| Experiment Example 22 | 65 | — | — | Collapsed | 0.48 |
| Experiment Example 23 | 100 | — | — | Collapsed | 0.32 |

Table 1 also shows the volume % of cubic boron nitride in the cubic boron nitride sintered material. Further, regarding the composition of the binder, it was confirmed that at least WC, Co, and Al compound existed in each of Experiment Examples 1 to 10 and Experiment Examples 21 to 22. Since no distinct peak was detected in XRD with regard to the Al compound, it was presumed that the Al compound was a composite compound composed of a plurality of Al compounds.

Referring to Table 1, in each of Experiment Examples 1 and 4 to 10, the above-described conditions (1) and (2) were satisfied in all the six visual fields of six arbitrarily extracted interfaces. In Experiment Example 2, the above-described conditions (1) and (2) were satisfied in one visual field of six arbitrarily extracted interface regions. In Experiment Example 3, the above-described conditions (1) and (2) were satisfied in three visual fields of six arbitrarily extracted interface regions. Therefore, the average value thereof is shown in each of the columns of Experiment Examples 1 and 3 to 10. On the other hand, in each of Experiment Examples 21 to 23, no carbon-containing region was observed in all the six visual fields of six arbitrarily extracted interfaces. Therefore, the above-described conditions (1) and (2) were not satisfied therein. Hence, "-" is indicated in each of the columns of Experiment Examples 21 to 23.

Referring to Table 1, it was confirmed that the cubic boron nitride sintered materials of Experiment Examples 1 to 10 have higher bending strengths than those of the cubic boron nitride sintered materials of Experiment Examples 21 to 23. It should be noted that "Collapsed" in each of Experiment Examples 22 and 23 means that the cubic boron nitride sintered material having been through the acid treatment was spontaneously broken. Regarding each of the cubic boron nitride sintered materials of Experiment Examples 1 to 10, it is understood that the cubic boron nitride grains are bound together strongly because the bending strength of the specimen having been through the acid treatment is high. This result also supports the hypothesis that the existence of carbon promotes neck growth between the cubic boron nitride grains.

Further, in each of Experiment Examples 1 to 10, the cutting distance is significantly longer than that in each of Experiment Examples 21 to 23. In view of this, it was confirmed that the lives of the cubic boron nitride sintered materials according to Experiment Examples 1 to 10 were significantly long. Among them, in Experiment Examples 2 to 4 and 7 to 9, the cutting distances are significantly long. Hence, it was confirmed that when width D is 0.1 to 5.0 nm and maximum value M is 0.1 to 5.0 atom %, the life can be more significantly long.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A method of producing a cubic boron nitride sintered material, the method comprising:
    forming an organic cubic boron nitride powder by attaching an organic substance onto a cubic boron nitride source material powder;
    preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al; and
    obtaining the cubic boron nitride sintered material by sintering the powder mixture,
    wherein the forming of the organic cubic boron nitride powder includes introducing the cubic boron nitride source material powder and the organic substance into supercritical water.

2. The method of producing the cubic boron nitride sintered material according to claim 1, wherein the organic substance is an amine or a hydrocarbon compound having a carbon number of more than or equal to 5.

3. The method of producing the cubic boron nitride sintered material according to claim 2, wherein the organic substance is hexylamine, hexylnitrile, paraffin, or hexane.

4. The method of producing the cubic boron nitride sintered material according to claim 1, wherein the forming of the organic cubic boron nitride powder includes attaching the organic substance onto the cubic boron nitride source material powder by plasma treatment.

5. The method of producing the cubic boron nitride sintered material according to claim 4, wherein the organic substance is an amine or carbon fluoride.

6. A method of producing a cubic boron nitride sintered material, the method comprising:

forming an organic cubic boron nitride powder by attaching an organic substance onto a cubic boron nitride source material powder;

preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al; and obtaining the cubic boron nitride sintered material by sintering the powder mixture, wherein the forming of the organic cubic boron nitride powder includes attaching the organic substance onto the cubic boron nitride source material powder by plasma treatment.

7. The method of producing the cubic boron nitride sintered material according to claim 6, wherein the organic substance is an amine or carbon fluoride.

* * * * *